United States Patent
Kloberdans et al.

(10) Patent No.: US 8,953,778 B2
(45) Date of Patent: Feb. 10, 2015

(54) REAL-TIME INTELLIGENT MUTE INTERACTIVE FEATURES

(71) Applicant: Avaya Inc., Basking Ridge, NJ (US)

(72) Inventors: Michael J. Kloberdans, Brighton, CO (US); Dean D. Beightol, Superior, CO (US); Paris T. Pitts, Bellevue, WA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/919,186

(22) Filed: Jun. 17, 2013

(65) Prior Publication Data

US 2014/0369491 A1    Dec. 18, 2014

(51) Int. Cl.
*H04M 1/00* (2006.01)
*H04M 1/66* (2006.01)
*H04M 9/00* (2006.01)
*H04M 1/19* (2006.01)

(52) U.S. Cl.
CPC ..................................... *H04M 1/19* (2013.01)
USPC .................................. 379/421; 379/202.01

(58) Field of Classification Search
USPC ............ 379/202.01, 203.01, 204.01, 207.01, 379/207.02, 393, 421; 455/414.1, 416, 455/569.1, 569.2
See application file for complete search history.

(56) References Cited

U.S. PATENT DOCUMENTS

| | | | |
|---|---|---|---|
| 7,720,217 B1 | 5/2010 | Connolly | |
| 7,848,511 B2 | 12/2010 | Dresher et al. | |
| 8,060,366 B1 * | 11/2011 | Maganti et al. | ............... 704/246 |
| 2006/0280295 A1 | 12/2006 | Runcie | |
| 2010/0260332 A1 * | 10/2010 | Brown et al. | ................. 379/421 |
| 2011/0051917 A1 | 3/2011 | Chen et al. | |

* cited by examiner

*Primary Examiner* — Tuan D Nguyen
(74) *Attorney, Agent, or Firm* — Sheridan Ross P.C.

(57) ABSTRACT

A system and method including selecting a mute feature in a first communication session of a first user with a second user using a verbal command by the first user, where the mute feature suspends an audible signal of the first user in the first communication session.

20 Claims, 5 Drawing Sheets

REAL-TIME INTELLIGENT MUTE INTERACTIVE FEATURES

TECHNICAL FIELD

The systems and methods disclosed herein relate to providing configurable mute features to users of communication devices. In particular, the present disclosure is directed to providing configurable mute features in response to detecting voice signals.

BACKGROUND

Communication devices (also referred to as telephony devices) often provide mute selection features and voice activation features. Voice activation features allow, for example, voice activated audio recorders. Such recorders may allow devices to conserve storage space for voice data, for example. In addition, Voice over IP (VoIP) telephony devices often do not send data packets if it is determined that a user of the device has not spoken in order to conserve bandwidth.

Mute selection features allow, for example, a user of a communication device, such as a telephone or video telephone, to deactivate the microphone (e.g., activate a mute signal) on a local device. Accordingly, by activating the mute signal, a user can conduct private conversations while continuing to receive audio signals from other telephony endpoints that are parties to a call. In addition, the mute function can also be selected by a user so that background noise such as typing, rustling papers, or other noises are not transmitted from the user's endpoint to other endpoints. Although typically used in conjunction with a speakerphone function, many telephones also allow muting of a handset microphone through selection of a mute feature.

Conference calling is when a user couples two or more telephone lines such that the multiple users associated with the respective telephone lines may communicate with each other in one call. Alternatively, the user may place multiple calls and communicate with each of the called parties without allowing the called parties to communicate with each other. Thus, multi-line calling techniques may allow multiple callers to be connected in order to communicate with each other. Conference and multi-person calling have become increasingly popular and common calling techniques for businesses as well as individual subscribers.

Many conferencing systems employ a dedicated line for each user (also referred to as a participant) in the conference call. The reason typical conferencing systems require users to use their own communication device is because signal processing is thus made a much easier task and additional features can be provided to the customer. For example, if a single user is using a dedicated communication device and subsequently is communicating with the other users via a dedicated line, that single user's voice can be easily separated from the other users' voices and can be altered in a relatively easy fashion. In other words, when each user is using a dedicated hard line, there exist many methods that allow one user to alter another user's voice. Users can cut out audio or otherwise alter another user's participation if they do not wish to speak with him/her. Users may also mute their own dedicated communication device if they wish to talk to someone else and have a side conversation without transmitting their audio to everyone.

A standard telephone or conference call may have a set of features that are common to all users. The mute feature is a feature that allows the user to stop and restart the audio and/or video on a call. The selection of a mute feature may be accomplished by pressing a mute feature button on the user's device. Selection of a mute feature button typically deactivates the speaker phone microphone and/or handset microphone of the user's telephony device. The conference call participant(s) usually doesn't know if a user is on mute. The muting user is able to activate and deactivate the feature using a button or switch, or by feature access codes.

SUMMARY

However, mute features currently in use are problematic. This is because, for example, although visual and/or audible indicators may be provided to a muting user to let him or her, or a co-located group, know that the mute feature is enabled or disabled, these indicators can be largely ineffective because the user forgets about them. Thus, a muted user will often begin to speak and not realize that he or she still has the mute feature activated. Time is wasted as the speaker realizes that he or she is on mute while others wait for him or her to respond to something on the call. Also, the features don't allow the user to intelligently and nimbly interact with the system and/or other users using the mute features. Systems and methods are provided to solve these and other problems and disadvantages of the prior art.

In certain aspects of the present disclosure, a user can define and configure voice commands to intelligently suspend voice on a call (e.g., activate a mute feature). The user may perform other actions, such as interact with others, before returning to the call. In addition to detecting that the mute feature has been activated or deactivated, new command features may be implemented, which may be voice activated and/or customizable. The new user-defined set of voice command features may include commands such as Sidebar, Take-1, Take-5, Resume, and Stop, among others, which may enhance both two-party and conference calls.

Visual and audible indicators are typically given to a user to let him or her know that a mute feature is on or off. However, the status indicators don't allow the user to intelligently and nimbly interact using the mute feature. Most indicators also don't stop users from talking while muted, wasting time on calls as adjustments are made. Further, in aspects of the present disclosure, features that provide intelligent feedback with options for the user may be implemented.

For example, if a user who is muted talks, an audible signal may be heard and an LED may be lit, signifying to the user that he or she is on mute. Configurable features may additionally provide and be operable to understand and respond to a list of user defined and manageable commands. In some aspects of the present disclosure, if a user configured 'Sidebar' as a voice command, the visual and/or audible feedback feature would cease active mute status notification (flashing LED or voice nagging), because it would be understood that the muted party wants to have a sidebar conversation and the user is now assuming control over the feedback mechanism. Similarly, 'Take-5' could be programmed such that the communication conference (or two-party call) would suspend active visual and/or audio mute notification for a user-defined amount of time, and static indications of mute status could remain.

In various aspects of the present disclosure, different users and/or groups could customize their mute features. For example, one user or organization could configure "Take-5" to be a five minute period during which the mute feature is activated and a "Take-1" to be a one minute period during which the mute feature is activated. The user could also configure a voice command such as "Return Now" or "Stop" to cause the mute feature to cease. Thus, voice commands may be user defined to accommodate any culture, company, or user needs. The actions from these voice commands may be user defined from either a system list of commands and actions or may involve third party custom programming and integration using a switch interface or other software hooks and interfaces, or they may be entirely user customizable.

An engine serving the interactive and/or configurable mute features can be centrally controlled; e.g., as with a conference bridge, Unified Communications (UC) system, public branch exchange (PBX), or third party stand-alone controller, among others, or the feature can be controlled by the endpoint. In further embodiments, split or shared control may be implemented.

Further, endpoint controlled features may enable third party phones to allow interactive voice command mute features even when the main telephony system doesn't natively supply such a feature. Such endpoint controlled features may offload the processing from a telephony system, thereby keeping central processing unit (CPU) cycles focused on telephony functions.

Still further, centralized controlled features could allow deeper interactive functionality because, for example, a more powerful CPU, larger memory, and integration to other components are inherently part of a centralized system. Also, a shared control system could allow basic interactive services by the endpoint and utilize deeper interactive features when needed by the centralized controller.

Thus, pre-programmed, user-defined sets of voice commands can allow a user to have a new, richer level of versatility and control for audio and video muting and enable improved meeting productivity.

Additionally, voice commands may be disruptive to other users who may hear the commands. Thus, unless all participants in a conference, or the other end of a two-party call, know that you are going on mute, it is clumsy and disruptive to issue a voice command if the other participant(s) on the call hear that command. Thus, use of a predefined hard or soft button on the client telephony device to suspend the voice transmission to the other party(s) but allow the voice command to be processed, is an advantageous embodiment of the present disclosure. Differences between such an action (e.g., pressing a button and speaking a mute command) and the action of pressing a mute button include the advantages that a user may get predefined features of mute reminders or other controls built into the system, as disclosed herein. Therefore, a user having the option the hide their voice command would make the presently disclosed embodiments much more useful.

These and other advantages will be apparent from the disclosure of the disclosure(s) contained herein. The above-described embodiments and configurations are neither complete nor exhaustive. As will be appreciated, other embodiments of the disclosure are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
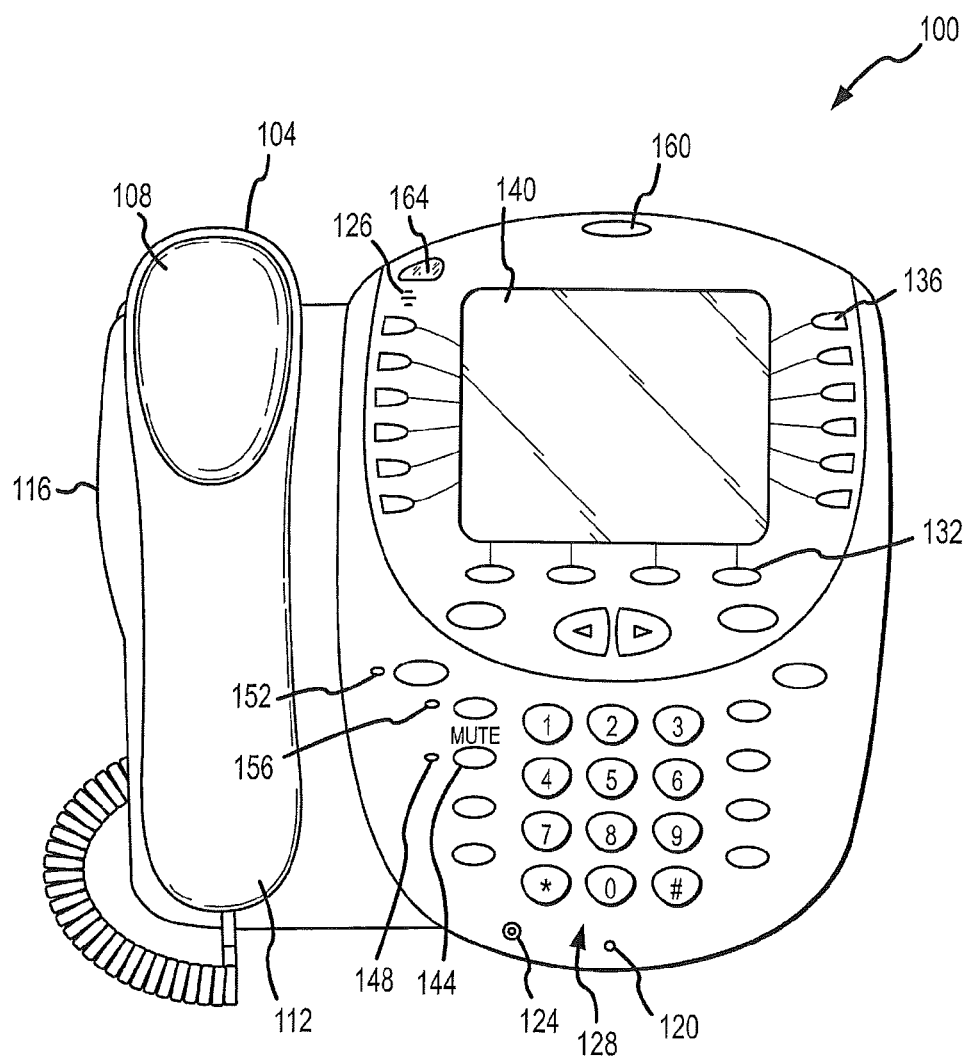
FIG. 1 depicts an illustrative communication device in accordance with embodiments of the present disclosure.

With reference now to FIG. 1, a communication device 100 in accordance with embodiments of the present disclosure is illustrated. In particular, a communication device 100 comprising a voice telephone is illustrated. However, embodiments of the present disclosure are not so limited and may be any device that can communicate on the network (described further in FIG. 2), such as a Personal Computer (PC), a telephone, a video system, a cellular telephone, a Personal Digital Assistant (PDA), a tablet device, a notebook device, and the like. Any number of communication devices may be connected to network, including only a single communication device. In addition, any communication device(s) may be directly connected to an adjunct box or system implement methods as disclosed herein.

The exemplary communication device 100 generally includes a handset 104 that incorporates a speaker 108 and a microphone 112. In addition, a speaker 116 and microphone 120 are provided for hands free (e.g., speakerphone) operation. A communication device 100 may additionally comprise a headset jack 124 for enabling hands free operation in connection with use of a headset. A mute feature selection reminder audio transducer 126 may also be provided.

The communication device 100 may also provide a numeric keypad 128, soft keys 132 and line/feature buttons 136. In general, the soft keys 132 and line/feature buttons 136 are used in connection with application specific features and can have variable functions, generally indicated by a label presented by a visual display 140. The communication device 100 may also provide dedicated feature buttons, including a mute feature button 144, that allows a user to deactivate or disable the provision of audio signals picked up by a microphone, such as the handset microphone 112, speakerphone microphone 120 or a microphone provided as part of a headset, to prevent the transmission of voice signals or other noises signals from the communication device 100 to any other communication devices with which the communication device 100 is engaged in a call.

The display 140, in exemplary embodiments, comprises a liquid crystal or other type of visual display capable of presenting messages and information to a user. Such information may include information related to the status of the communication device 100 and labels associated with the soft keys 132 and line/feature keys 136. In accordance with embodiments of the present disclosure in which the communication device 100 comprises a video telephone, the display 140 may also operate to display images from one or more endpoints with which the communication device 100 is engaged in a video call, as well as display information associated with configurable features associated with mute functions of the present disclosure.

The communication device 100 may additionally include various visual indicators. Such indicators may include a mute feature selection light or lamp 148 that may light when the speakerphone microphone 120, handset microphone 112, and/or headset microphone is muted such that other parties to a call are prevented from hearing audible signals from the location of the communication device 100. Other visual indicators may include a speakerphone selection lamp 152 that may light when the speakerphone function is selected, a headset function lamp 156 that may light when the headset is active, and a message waiting lamp 160 that may be illuminated when there is a message waiting on the user's voice mail. A mute feature selection reminder lamp 164 may also be provided. As used herein, a light or lamp is not limited to any particular technology for providing a visual output.

Figure 2:
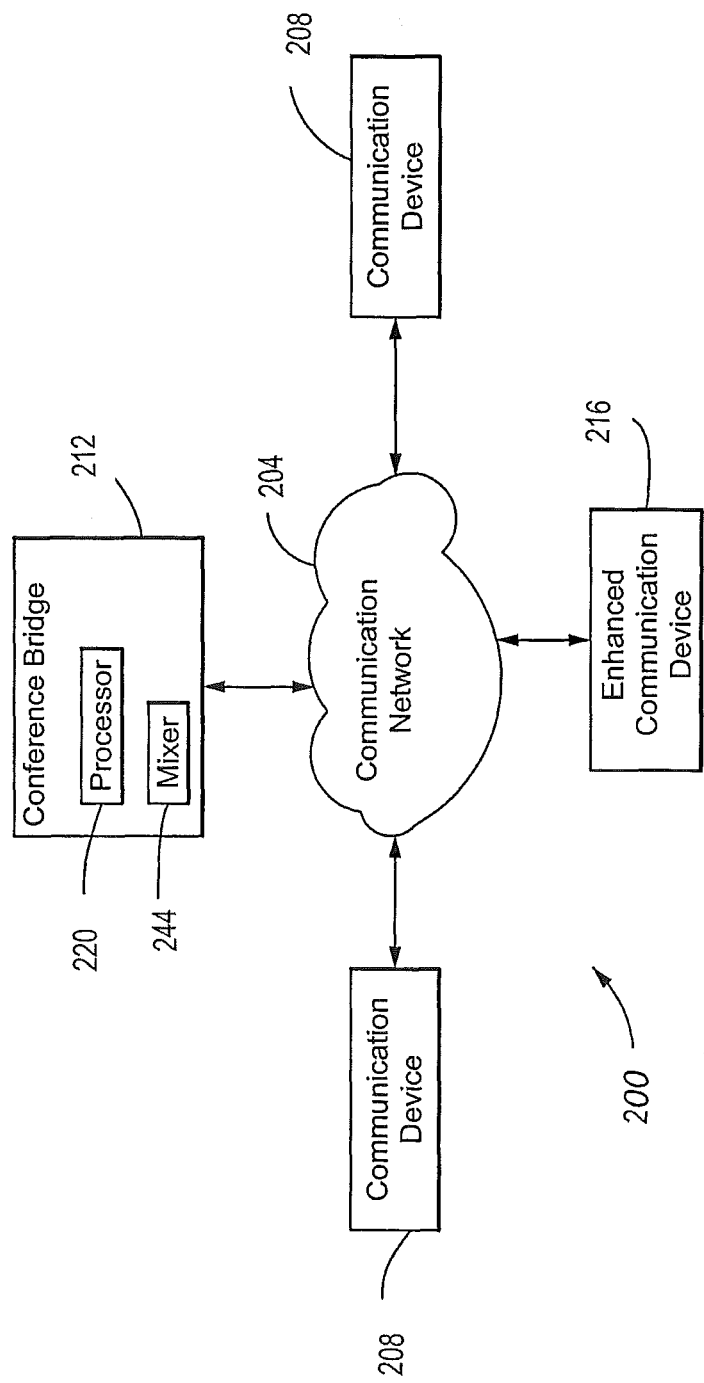
FIG. 2 depicts a block diagram of an illustrative communication system in accordance with embodiments of the present disclosure.

Referring now to FIG. 2, an exemplary communication system 200 will be described in accordance with embodiments of the present disclosure. The communication system 200 generally comprises a communications network 204 (e.g., a packet switched network and/or a circuit switched network), a plurality of communication devices 208, a conference bridge 212, and an enhanced communication device 216.

The communications network 204 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like. The network 204 typically includes proxies, registrars, and routers for managing packet flows in the case of a packet-switched network.

The communication devices 208 and/or 216 may be packet-switched and can include, for example, Internet Protocol (IP) hardphones such as Avaya Inc.'s 4600 Series IP Phones™, IP softphones such as Avaya Inc.'s IP Softphone™, Personal Digital Assistants (PDAs), Personal Computers (PCs), laptops, packet-based H.320 video phones and conferencing units, packet-based voice messaging and Interactive Voice Response (IVRs), and packet-based traditional computer telephony adjuncts.

The communication devices 208 and/or 216 may also be circuit-switched in the event that a circuit-switched network is utilized. Circuit-switched communication devices 208 can include, for example, wired and wireless telephones, PDAs, H.320 videophones and conferencing units, voice messaging and response units, and traditional computer telephony adjuncts.

The conference bridge 212 comprises a processor 220 and a mixer 224. The processor 220 is operable to perform various signal processing functions on any incoming signal. For example, if a first user wishes to mute themselves during a conference, then the first user may send a command to the processor 220 requesting such service. The processor 220 will then mute or otherwise remove the second user's voice signal before it is transmitted to the first user. The processor 220 is also operable to perform any other predetermined functions within a memory of the conference bridge 212, including voice activated mute features and configurable mute features, as described herein.

Users of the external and internal endpoints may wish to communicate with one another across the communication network 204. In the event that a simple point-to-point connection is desired, the two subject endpoints are directly connected by hardware within the communications network 204 and a single communication path is established. However, when several users of the external endpoints wish to conference with each other simultaneously, the conference bridge 212 is typically employed. The conference bridge 212 connects each channel from each endpoint participating in the conference call such that every user of the conference call can hear what any one of the other users is saying at a given time. This is accomplished by a number of mechanisms.

It should be emphasized that the configuration of the conference bridge, communication device, and other elements as shown in FIG. 2 is for purposes of illustration only and should not be construed as limiting the disclosure to any particular arrangement of elements. For example, the conference bridge 212 logic may be included in a switch/server or be configured as an adjunct to a switch/server (where a switch/server can include a call server, a conference server, and a communication manager, for example). Thus, logic for implementing mute features in conjunction with voice commands and/or configurable mute features may be included in a switch/server or be configured as an adjunct to a switch/server. Further, such features may be implemented by logic in one or more endpoints or in firmware that may be added to a pre-existing system.

Figure 3:
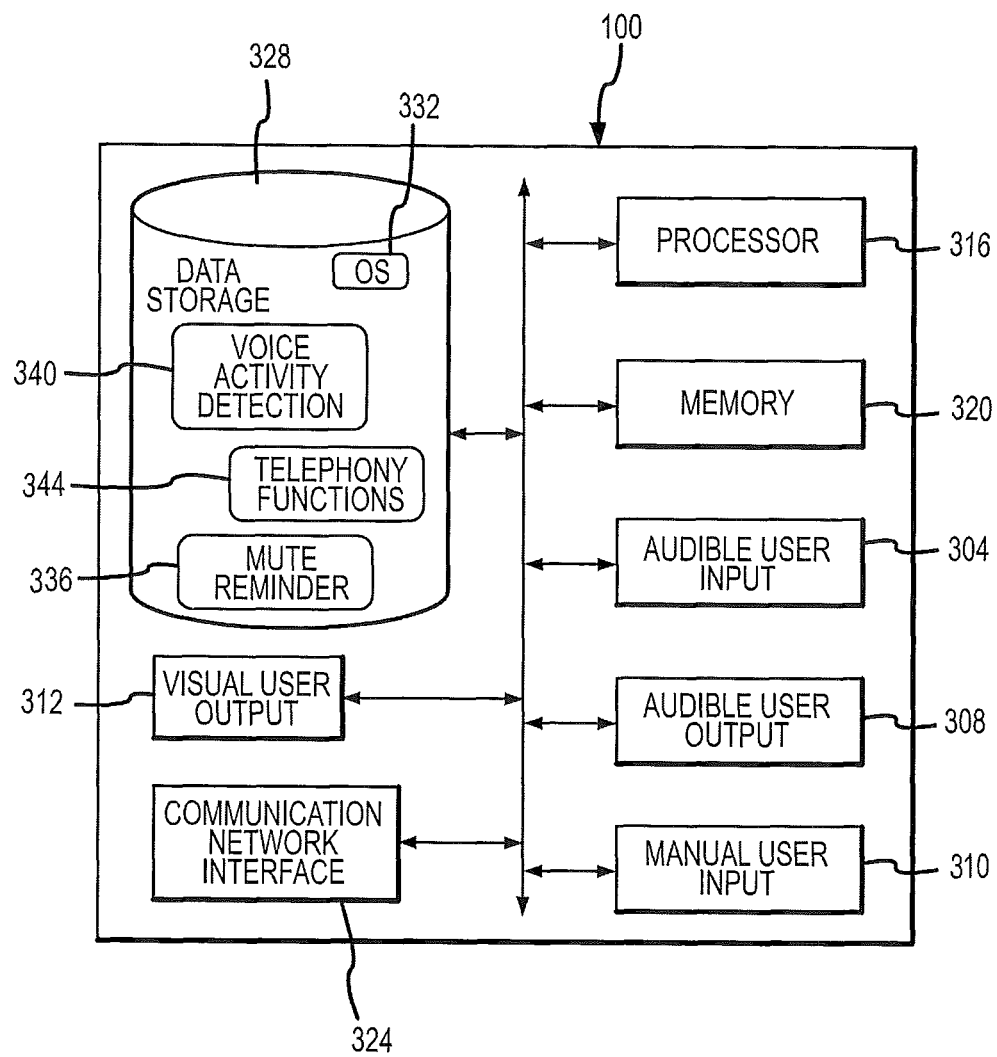
FIG. 3 is a block diagram of an illustrative communication system in accordance with embodiments of the present disclosure.

With reference now to FIG. 3, components that may be included as part of a communication device 100 are depicted in block diagram form. Such components may include one or more audible user inputs 304, such as the handset microphone 112, speakerphone microphone 120, or a microphone provided as a headset. One or more audible user outputs 308 may also be provided. Examples of audible user outputs 308 include the handset speaker 108, speakerphone speaker 116, and a speaker provided as part of a headset. Additional examples of audible user outputs 308 include any additional audio transducers that may be provided, for example in connection with an audible ringer for indicating an incoming call, audible transducers for confirming feature selections, or an audio transducer 126 providing a mute feature selection reminder. As can be appreciated by one of ordinary skill in the art from the description provided herein, an audible user output 308 may provide more than one function.

As an illustrative example, the speakerphone speaker 116 may, in addition to providing an output comprising a voice signal from another endpoint to a call, provide a ringer function to indicate an incoming call, and/or provide an audible output comprising a mute feature selection reminder. Accordingly, a dedicated mute feature selection audio transducer 126 need not be included in order to provide an audible mute feature selection reminder.

One or more manual user inputs 310 may be included as part of the communication device 100 for receiving input from a user. Examples of manual user inputs 310 include keys or buttons provided as part of a numeric keypad 128, as soft keys 132, as line/feature buttons 136, or a mute feature button 144. Furthermore, manual user inputs 310 may enable a user to perform various functions, such as activating or deactivating a mute feature by pressing a mute feature button 144 or another user input, such as a soft key 132 operating as a mute feature button.

One or more audible user inputs 304 may be included as part of the communication device 100 for receiving input from a user. Examples of audible user inputs 304 include voice commands and other audible signals. Furthermore, audible user inputs 304 may enable a user to perform various functions, such as activating or deactivating a mute feature by using audible commands, as well as managing and configuring mute features using audible commands. Additionally, the audible user inputs 304 may depend on aspects of an audible signal, such as the volume, length, and repetitiveness of the signal.

The communication device 100 may also include one or more visual user outputs 312. Such visual user outputs may include visual output provided by a display 140 and/or by indicator lamps such as lamps 148, 152 and 160. Another example of a visual user output 312 is a mute feature selection reminder lamp 164.

A processor 316 may be provided to run programming code implementing various functions performed by the communication device 100 including functions associated with providing a mute feature selection reminder. In accordance with embodiments of the present disclosure, such functions may additionally include performing voice and/or audible signal detection in connection with mute features and/or mute feature selection reminder functions. The processor 316 may include any general purpose programmable processor or controller, for example, audible user input 304, for executing application or operating system programming or instructions. Alternatively, the processor 316 may comprise a specially configured application specific integrated circuit (ASIC). Memory 320 may also be provided for use in connection with the execution of the programming by the processor 316, and for the temporary or long term storage of data or program instructions. Memory 320 may comprise solid state memory, such as DRAM or SDRAM. Where the processor 316 comprises a controller, the memory 320 may be integral to the processor 316.

A communication network interface 324 interconnects the communication device 100 to a communication network. For example, where the communications device 100 comprises an IP telephone, implemented either as a stand alone device or as a soft phone function provided in connection with a general purpose computer, the communication network interface 324 may comprise an Ethernet interface.

Data storage 328 may be included for storing programming or data. For example, the data storage 328 may store operating system instructions 332 and any configured commands, including voice commands. Applications that may be stored in data storage 328 include a mute feature selection reminder application 336, a voice activity detection application 240, and telephony function applications 244. The data storage 328 may include magnetic storage devices, solid state storage devices, optical storage devices, logic circuits, or any combination of such devices. It should further be appreciated that the programs or data that may be maintained in the data storage 328 can comprise software, firmware or hard wired logic, depending on the characteristics of the data storage 328. In addition, various functions and applications may be integrated with one another and/or provided separately.

Figure 4:
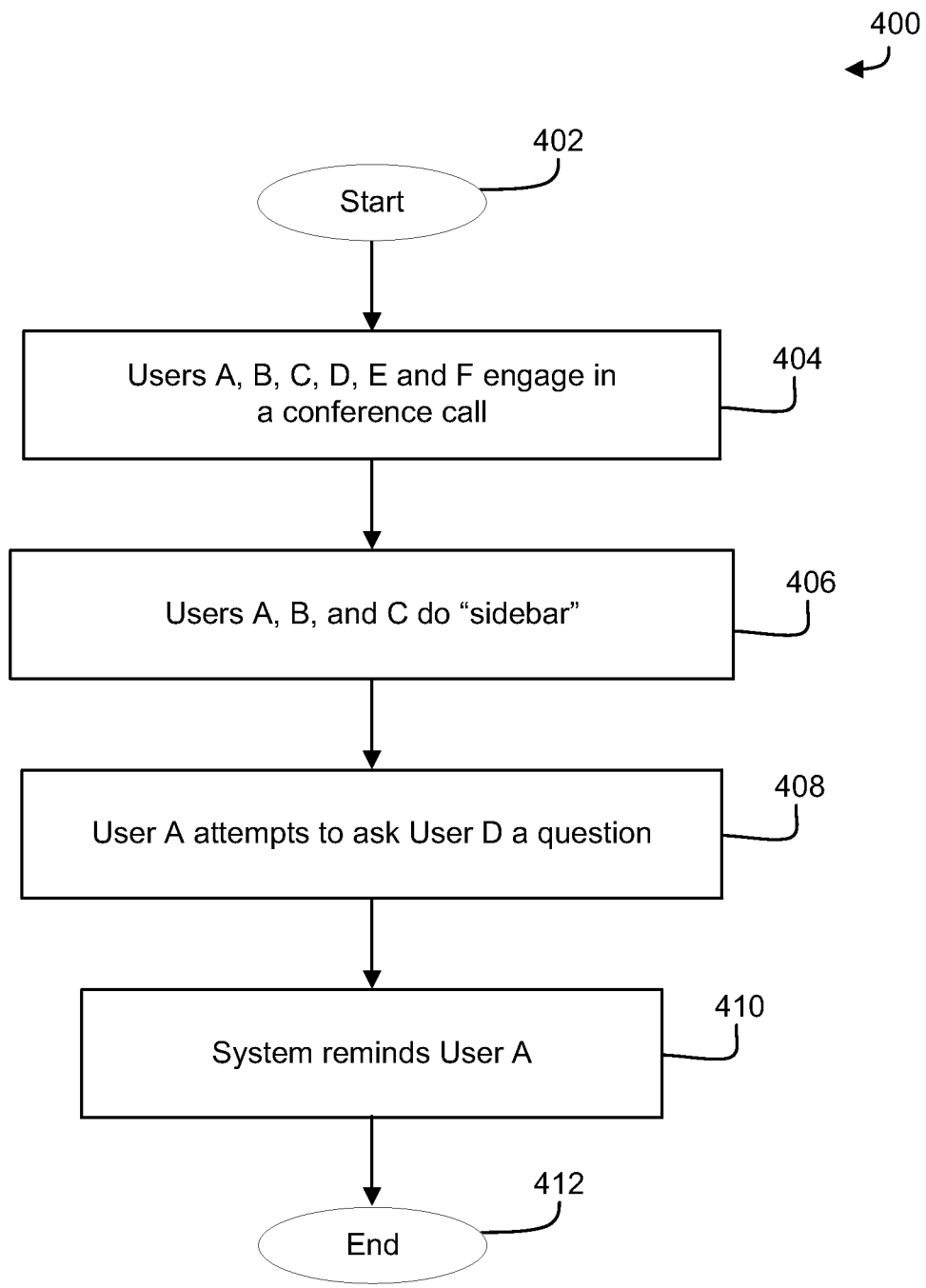
FIG. 4 depicts a flowchart illustrating aspects of the operation of an illustrative communication system in accordance with embodiments of the present disclosure.

FIG. 4 depicts a flowchart illustrating aspects of the operation of an illustrative communication system in accordance with embodiments of the present disclosure.

In particular, the illustrative method 400 of FIG. 4 starts at 402. In step 404, User A engages in a conference call. For example, User A calls in to a conference call set up by User C. Four additional users also call in to the conference call; Users B, D, E, and F. The conference call is integrated with a system implementing the mute features described herein using an adjunct box connected to the call server. Alternatively, the conference call may be integrated to a system implementing the mute features described herein through a processor having such logic in the conference bridge or in the endpoints of the users, or in a stand-alone adjunct box connected to a server managing the conference call.

During the conference call Users A, B, and C decide they need to have a sidebar conversation. Users A, B, and C, in step 406, each say the phrase "sidebar" and the system recognizes that the users wish to join in a sidebar conversation. In embodiments, the system has been configured to recognize the voice command of "sidebar." Thus, the system executes the sidebar command. For example, the system mutes Users A, B, and C so that Users D, E, and F cannot hear their conversation; however, the system allows voice signals to transmit between the endpoints of Users A, B, and C so that they can continue to hear each other. In embodiments, Users A, B, and C are located in one room and connected via a single communication device. Thus, when User A gives the user-defined voice command of "sidebar," the system places the room microphones on mute. This is an example of conference with a co-located group making the call more efficient for the entire list of participants.

In step 408, User A decides she needs to ask User D a question, but User A forgets that they are currently in a sidebar state where their voices are muted to Users D, E, and F. In particular, despite the indication of a mute status (e.g., an LED indicator, solid or flashing), such an indicator was not effective enough to remind User A of the mute status. Thus, User A raises her voice to ask User D a question, saying "User D, we were wondering . . . ". However, the system detects that User A is attempting to communicate with a person on the conference call that cannot hear her. For example, the system may detect raised a volume level of User A's voice, or the words "User D, or the words "User D" in combination with a raised volume level. Thus, such factors may enable the system to detect that User A is attempting to communicate with a person on the conference call that cannot hear her. Such detection features may be configured in firmware, or user configured. Alternatively, the system may suspend verbal and/or audio reminders that a call is muted, which can allow the room of participants to have a discussion without system interference or annoyances as well as provide full control of the muted duration (and full responsibility of returning from mute) to a user who has overridden the standard mute alerting functions.

In step 410, the system reminds User A of the mute status due to the sidebar conversation. For example, the system may recognize that User A is not discussing User D as a topic in the sidebar conversation, and is instead attempting to speak to User D due to the raised volume level of User A's voice when saying "User D." The system may provide User A with a verbal response that escalates in intensity in order to shorten the length of time that User A is attempting to speak with User D without remembering the sidebar status. In various embodiments, the system may confirm whether User A is attempting to communicate with User D by questioning User A upon detecting the phrase "User D" to determine whether User A intends to speak about User D, or to User D.

Alternatively, there could be several sidebar conversations occurring. For example, Users E and F could also be engaging in a sidebar conversation. Multiple sidebar conversations could occur in a similar manner as discussed above, without intending to limit the disclosure to any particular embodiment.

Thus, advantageously, a system may be used that allows voice activation and/or customization of mute features, or integrated into a pre-existing system to allow voice activation and/or customization of mute features. Also, users may use voice commands to implement and manage mute features. In addition, users may configure mute features to customize their experience and interaction with the system, or may use pre-configured mute features. In step 412, the illustrative method ends.

Figure 5:
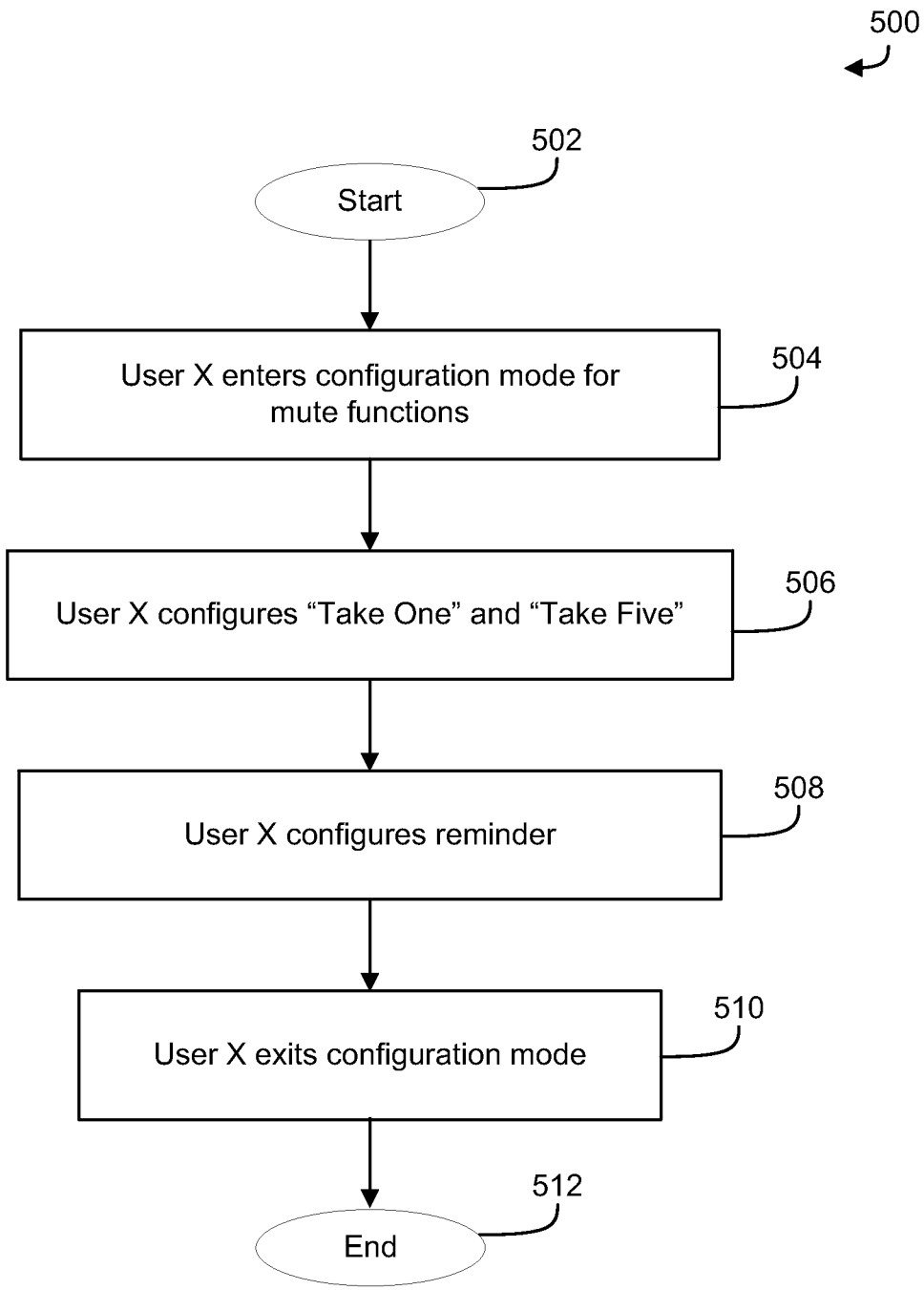
FIG. 5 depicts a flowchart illustrating aspects of the operation of an illustrative communication system in accordance with embodiments of the present disclosure.

FIG. 5 depicts a flowchart illustrating aspects of the operation of an illustrative communication system in accordance with embodiments of the present disclosure.

In particular, the illustrative method 500 of FIG. 5 starts at 502. In step 504, User X enters a configuration mode for mute features in the communication system. User X may enter the configuration mode using verbal commands, or by using manual input buttons and/or a password, for example. Once in the configuration mode, User X may configure the mute features and/or voice commands in the communication system. User X wants to set up automatic muting features because User X is often engaged in phone calls, or in conference or training calls with other participants.

In step 506, User X configures "Take-1" and "Take-5" verbal commands. In particular, User X works in a warehouse environment, where hourly status reports are provided over an intercom system, and conversations frequently occur either via User X's walkie talkie, or in User X's office. User X may configure the system to automatically "Take-1," which mutes User X's audio signal for one minute, when audio is transmitted by the intercom system, and to confirm turning on the mute feature for a "Take-5," which mutes User X's audio signal for five minutes, when audio is detected (e.g., sound within User X's office. The "Take-1" and "Take-5" may be configured to be any amount of pre-set or variable time, as well as any command. This can be an example of a single call participant multi-tasking where any other participants in a conference group aren't aware of User X's temporary absence from a call. Also, User X may configure the mute features verbally.

In step 510, User X configures the system to provide a verbal reminder of the mute status every minute that the system is engaged in a "Take-5." This may be because, for example, User X wants to be reminded of the automatic "Take-5" that occurs when audio is detected in the office. In further embodiments User X may configure various other commands, such as additional mute commands, verifications, reminders, sidebar commands, return commands, commands to join another communication, and stop commands, among others. In step 510, User X exits the configuration mode, and the mute features are customized for User X to begin using.

Further, in various embodiments, User X can configure the system to use a hard or soft button in the communication system (e.g., on a communication device used by User X) to suspend User X's voice transmission to other users(s) in various communication session(s). User X can configure the button to allow voice commands to be processed, thereby advantageously allowing voice commands to be used as disclosed herein and yet preventing other users from hearing the voice commands. Further, when User X presses the button to use voice commands, User X may advantageously interact with the system using the voice commands that have been configured (e.g., defined by User X or predefined). Thus, User X may issue a voice command while preventing other participant(s) from hearing the command(s). In step 512, the process ends.

Thus, advantageously, User X may easily and nimbly manage multi-tasking using customized hands-free verbal commands to make the communications environment more manageable. In addition, customizable and intelligent mute features may additionally facilitate versatile telephony system behavior based on voice commands; for example, in the area of notification of mute status.

Illustratively, in embodiments, modules of the communication systems described herein are stored-program-controlled entities, such as a computer or processor, which performs the methods of FIGS. 4 and 5, and the processes described herein, by executing program instructions stored in a tangible computer readable storage medium, such as a memory or disk. Although the methods described in FIGS. 4 and 5 are shown in a specific order, one of skill in the art would recognize that the steps in FIGS. 4 and 5 may be implemented in different orders and/or be implemented in a multi-threaded environment. Moreover, various steps may be omitted or added based on implementation.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those of ordinary skill in the art will appreciate that the features described above can be combined in various ways to form multiple variations of the disclosure. As a result, the disclosure is not limited to the specific embodiments described above, but only by the following claims and their equivalents.

The foregoing discussion of the disclosure has been presented for purposes of illustration and description. Further, the description is not intended to limit the disclosure to the form disclosed herein. Consequently, variations and modifications commensurate with the above teachings, within the skill or knowledge of the relevant art, are within the scope of the present disclosure. The embodiments described here in above are further intended to explain the best mode presently known of practicing the disclosure and to enable others of ordinary skill in the art to utilize the disclosure in such or in other embodiments and with the various modifications required by their particular application or use of the disclosure. It is intended that the appended claims be construed to include alternative embodiments to the extent permitted by the prior art.

What is claimed is:

1. A method comprising:
   providing a mute feature to a first user while the first user is involved in a first communication session with at least a second user; and
   engaging the mute feature in response to receiving a predetermined verbal command from the first user during the communication session, wherein the mute feature, when engaged, mutes a signal of the first user in the first communication session;
   wherein t least one of the mute feature and the predetermined verbal command are configurable during the first communication session.

2. The method of claim 1, wherein the first user communicates with a third user in a second communication session after engaging the mute feature.

3. The method of claim 2, further comprising:
   selecting an interactive option after selecting the mute feature.

4. The method of claim 3, wherein the interactive option allows the first user to interact with the second communication session.

5. The method of claim 1, wherein the mute feature is configurable.

6. The method of claim 1, further comprising selecting a reminder feature to audibly convey to the first user the suspension of the audible signal, wherein the reminder feature is configurable.

7. The method of claim 1, wherein the predetermined verbal command is configurable.

8. The method of claim 1, further comprising:
receiving a feedback by the first user when the mute feature is engaged.

9. The method of claim 8, wherein the feedback is configurable.

10. The method of claim 1, wherein properties of the mute feature are configurable during the first communication session using a secondary predetermined verbal command.

11. The method of claim 1, further comprising:
selecting an interactive option after selecting the mute feature,
wherein the first user communicates with a third user in a second communication session after engaging the mute feature, and wherein the interactive option allows the first user to interact with at least one of the first communication session and the second communication session.

12. A non-transitory computer-readable medium comprising processor-executable instructions that are executable by a processor to facilitate a first communication session between a first user and a second user, the instructions comprising:
providing a mute feature to the first user while the first user is involved in the first communication session with at least the second user; and
engaging the mute feature in response to receiving a predetermined verbal command from the first user during the communication session, wherein the mute feature, when engaged, mutes a signal of the first user in the first communication session;
wherein at least one of the mute feature and the predetermined verbal command are configurable during the first communication session.

13. A communication device comprising:
a network interface configured to facilitate a first communication session between a first user and a second user;
a communication module configured to provide a mute feature to the first user while the first user is involved in the first communication session with at least the second user; and engage the mute feature in response to receiving a predetermined verbal command from the first user during the communication session, wherein the mute feature, when engaged, mutes a signal of the first user in the first communication session;
wherein at least one of the mute feature and the predetermined verbal command are configurable during the first communication session.

14. The communication device of claim 13, wherein the communication module is configured to facilitate a second communication session after engaging the mute feature, wherein in the second communication session, the first user communicates with a third user, the second communication session being a separate communication session from the first communication session.

15. The communication device of claim 13, wherein the communication module is configured to facilitate the selection of a reminder feature, by the first user, to audibly convey to the first user the suspension of the audible signal, wherein the reminder feature is configurable.

16. The communication device of claim 13, wherein the predetermined verbal command is configurable.

17. The communication device of claim 13, wherein the communication module is configured to receive a feedback by the first user when the mute feature is engaged, wherein the feedback is configurable.

18. The communication device of claim 13, wherein the communication module is configured to select, by the first user, an interactive option after selecting the mute feature.

19. The communication device of claim 13, wherein the communication device is an endpoint.

20. The communication device of claim 13, wherein the communication device is a server.

* * * * *

UNITED STATES PATENT AND TRADEMARK OFFICE
CERTIFICATE OF CORRECTION

| | | |
|---|---|---|
| PATENT NO. | : 8,953,778 B2 | Page 1 of 1 |
| APPLICATION NO. | : 13/919186 | |
| DATED | : February 10, 2015 | |
| INVENTOR(S) | : Michael J. Kloberdans, Dean D. Beightol and Paris T. Pitts | |

It is certified that error appears in the above-identified patent and that said Letters Patent is hereby corrected as shown below:

In the Claims

At Column 10, line 50, claim 1, please delete "t" and replace it with --at-- therein.

Signed and Sealed this
Twenty-third Day of June, 2015

Michelle K. Lee
*Director of the United States Patent and Trademark Office*